Nov. 11, 1969  J. W. RYAN ETAL  3,477,140
SOUND REPRODUCING MEANS AND LINKING SOUND
CARRIER MEANS TOY COMBINATION
Filed Feb. 23, 1967  7 Sheets-Sheet 2

INVENTORS
JOHN W. RYAN
EUGENE J. ECHTERLING
MICHAEL E. GOLDEN
JOHN H. GOETZ
RICHARD SHIH-TENG CHANG

BY Herzig, Walsh + Blackham
ATTORNEYS

Nov. 11, 1969  J. W. RYAN ETAL  3,477,140
SOUND REPRODUCING MEANS AND LINKING SOUND
CARRIER MEANS TOY COMBINATION
Filed Feb. 23, 1967  7 Sheets-Sheet 6

INVENTORS
JOHN W. RYAN
EUGENE J. ECHTERLING
MICHAEL E. GOLDEN
JOHN H. GOETZ
RICHARD SHIH-TENG CHANG

BY Herzig, Walsh & Blackhow
ATTORNEYS

United States Patent Office
3,477,140
Patented Nov. 11, 1969

3,477,140
SOUND REPRODUCING MEANS AND LINKING SOUND CARRIER MEANS TOY COMBINATION
John W. Ryan, Los Angeles, Eugene J. Echterling, Manhattan Beach, Michael E. Golden, Los Angeles, John H. Goetz, Sherman Oaks, and Richard Shih-Teng Chang, Gardena, Calif., assignors to Mattel, Inc., Hawthorne, Calif., a corporation of California
Filed Feb. 23, 1967, Ser. No. 618,164
Int. Cl. G09b 1/00, 19/04; G11b 3/68
U.S. Cl. 35—8                                                 8 Claims

ABSTRACT OF THE DISCLOSURE

Individual, elongated, thin blocks have information, such as words or music, or sounds, all printed and recorded thereon. Each block includes a male connector at its front end and a female connector at its rear end for linking a plurality of blocks together so that they may be run through a player which translates the recorded information into an audible sound. Alternatively, the blocks may be run through the player individually and automatically from a hopper provided on the player. The blocks may also be provided with pictures identifying the words printed and recorded thereon. Additionally, the blocks may be color coded for grammatically identifying the printed and recorded words.

The connectors may be arrow-shaped to indicate the direction in which the blocks should be moved with respect to the player.

BACKGROUND OF THE INVENTION

The background of the invention is set forth in two parts.

Field of the invention

The present invention pertains generally to the field of sound reproducing means and linking sound carrier means toy combinations and more particularly to player means for reproducing recorded sounds, carrier means having recorded sounds provided thereon and including means for indicating the proper direction of travel of the carrier means with respect to the player means for correctly reproducing the recorded sounds, linking means on the carrier means for linking a plurality of the carrier means together, indicia means on the carrier means for conveying a visual image of the recorded sounds and feed means for moving the carrier means through the player means including compressing means engageable with the carrier means for maintaining it in operative association with the player means and for minimizing sound-disturbing vibrations in the carrier means.

Description of the prior art

Sound reproducing means and sound carrier means combinations are known from such patents as United States Patents Nos. 2,603,006; 2,677,200 and 3,087,259. The devices disclosed in these patents all suffer from the disadvantage that they do not lend themselves readily for use as a toy. Although the device disclosed in Patent No. 3,087,259 is intended to be used as a toy, a child who is old enough to have sufficient dexterity to easily operate the toy soon loses interest in playing with it because of its limited versatility.

In view of the foregoing factors and conditions characteristic of sound reproducing means and sound carrier means combinations, it is a primary object of the present invention to provide a new and useful toy device for audibly reproducing recorded material not subject to the disadvantages enumerated above and having linking means for linking a plurality of carrier means together.

Another object of the present invention is to provide a toy device of the type described which includes sound carrier means having direction-indicating means for indicating the proper direction of travel of the carrier means with respect to a player means for reproducing sounds recorded on the carrier means.

Yet another object of the present invention is to provide a device of the type described which includes hopper means in combination with feeding means for automatically supply and feeding sound carrier means to a player means of the present invention.

A further object of the present invention is to provide linking sound carrier means having words printed and recorded thereon and including indicia grammatically identifying the words for facilitating the construction of sentences by a child user of the device.

A still further object of the present invention is to provide a new and useful linking sound carrier means having linking means provided thereon which not only serves to link a plurality of carrier means together, but also serves to indicate the proper direction that the carrier means should be moved into playing position on a player means.

SUMMARY OF THE INVENTION

According to the present invention, there is provided a toy device for audibly reproducing recorded material including the combination of player means for reproducing recorded sounds, carrier means having the recorded sounds provided thereon and including means for indicating the proper direction of travel of the carrier means with respect to the player means for correctly reproducing the recorded sounds, linking means for linking a plurality of carrier means together, indicia means for conveying a visual image of the recorded sounds and feed means for moving the carrier means through the player means.

The linking means may be so shaped and arranged that the linking means indicates the proper direction of travel of the player means. Also, the feed means includes compressing means engageable with the carrier means for maintaining it in operative association with the player means and for minimizing sound-disturbing vibrations in the carrier means.

The player means may be provided with hopper means for storing a supply of sound carrier means which are automatically fed to a playing position in the player means when the device is energized for enhancing the play value of the toy for younger children who like to obtain incongruous and humorous juxtaposition of words. The hopper means includes upstanding side walls which are shaped in such a manner that the direction-indicating means will automatically position the carrier means correctly in the hopper means.

The carrier means may have words, musical notes or the like printed and recorded thereon. Each carrier means may then be provided with suitable indicia for identifying particular categories of printed matter. For example, a group of rhyming words may be identified by providing suitable indicia, such as a particular color, for all carrier means of a group which contain rhyming words. The linking means then permits a child user to link a plurality of carrier means together into starting combinations of words, music, or the like.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

DESCRIPTION OF THE PREFERRED EMBODIMENTS

Figures 1, 2, 3, 4, 5, 10:
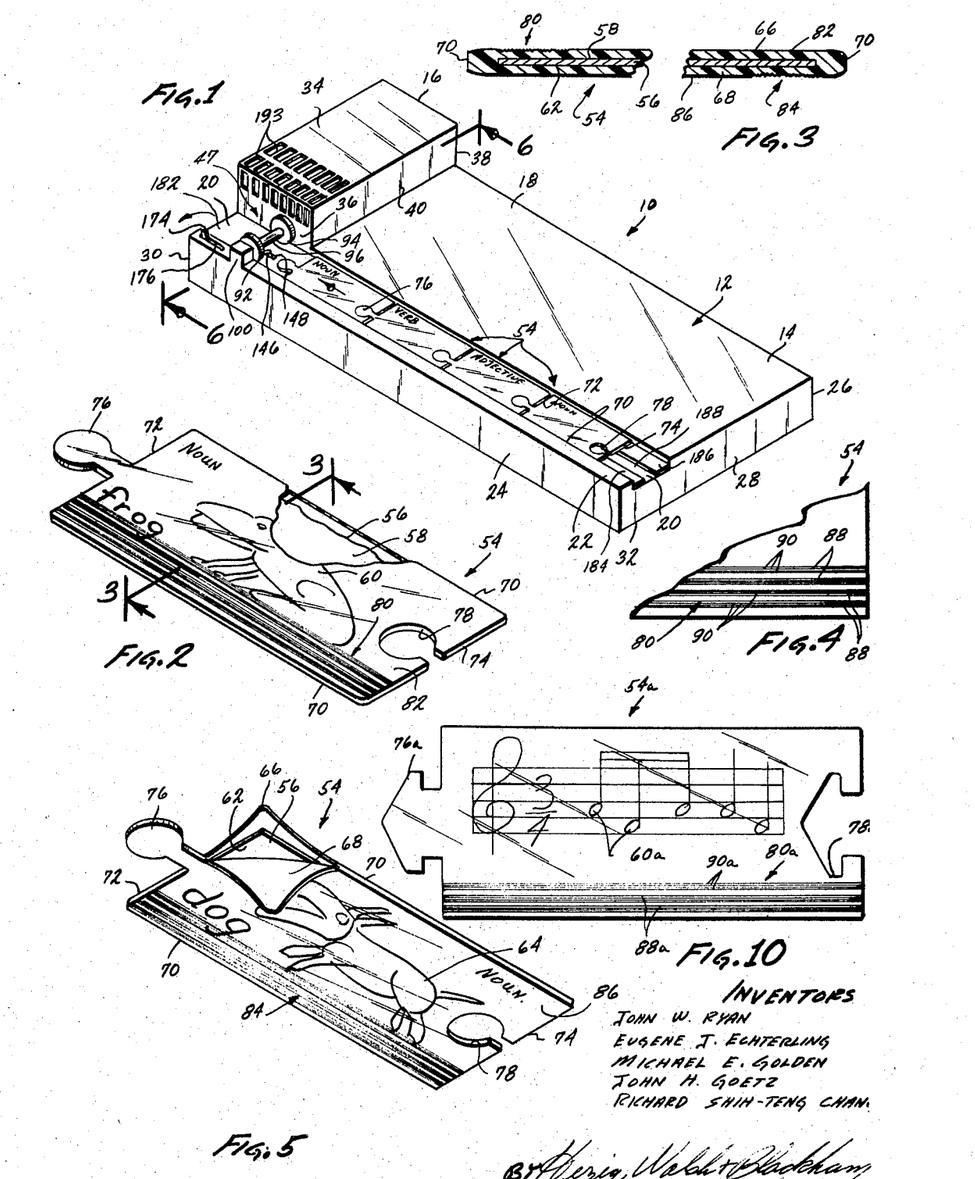
FIGURE 1 is a perspective view of a toy device constituting a first embodiment of the present invention.
FIGURE 2 is an enlarged, perspective view, with parts broken away to show internal construction, of a carrier means forming a part of the toy shown in FIGURE 1.
FIGURE 3 is an enlarged, partial cross-sectional view taken along line 3—3 of FIGURE 2.
FIGURE 4 is an enlarged, partial plan view of a portion of the carrier means shown in FIGURE 2.
FIGURE 5 is a partially-exploded, perspective view looking in at the bottom of the carrier means shown in FIGURE 2.
FIGURE 10 is a partial plan view of a modified carrier means which may be employed in place of the carrier means shown in FIGURE 2.
Figure 6:
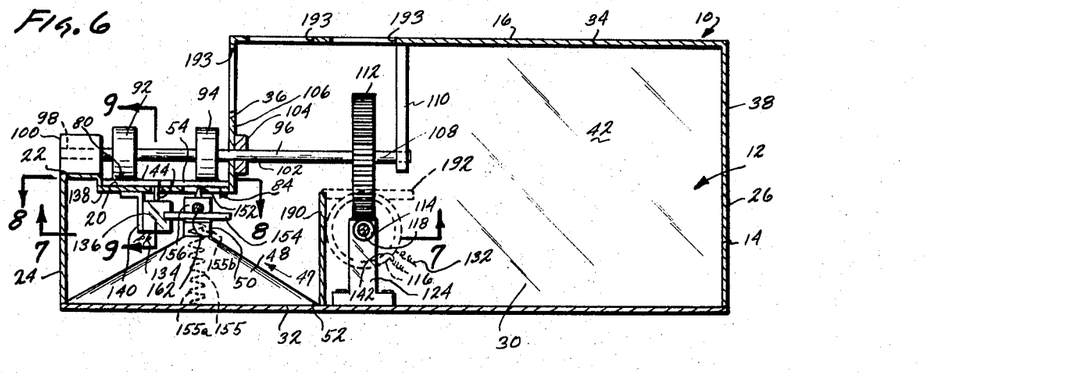
FIGURE 6 is an enlarged, cross-sectional view taken along line 6—6 of FIGURE 1.

Referring again to the drawings and more particularly to FIGURES 1 and 6, a toy device for audibly reproducing recorded material constituting a first embodiment of the present invention, generally designated 10, includes a main housing assembly 12 defining a table portion 14 and a gear housing portion 16. The table portion 14 includes a top wall 18 having a channel 20 provided therein adjacent one edge 22 thereof, a first side wall 24, a second side wall 26, a first end wall 28, a second end wall 30 and a bottom wall 32. The gear housing portion 16 includes a top wall 34, a first end wall 36, a second end wall 38, which is formed integrally with the side wall 26 of the table portion 14, a first side wall 40 and a second side wall 42, which is formed integrally with the end wall 30 of the table portion 14.

The toy 10 also includes a player means 47 which, in turn, includes a speaker cone 48. The cone 48 has an apex portion 50 and an open end 52 and is mounted in the table portion 14. The speaker cone 48 audibly reproduces material recorded on a plurality of carrier means in the form of linking, word-sound blocks 54 which may be moved along in channel 20 and into operative association with the speaker cone 48 in a manner to be hereinafter described.

Referring now more in particular to FIGURES 2–4, each block 54 includes a card 56 having an upper surface 58 upon which a first item of material 60 may be displayed and an underside 62 upon which a second item of material 64 may be displayed. For example, a picture of a frog and the word "frog" may be printed on the upper surface 58 and a picture of a dog and the word "dog" may be printed on the underside 62. Additionally, each card 56 may be provided with suitable indicia to indicate a general class, category or the like into which the visually-presented material falls. As shown herein for purposes of illustration, but not of limitation, such indicia comprises the word "noun" for all nouns shown on the cards 56, the word "verb" for all verbs shown on cards 56 and the word "adjective" for all adjectives shown on cards 56. The cards 56 may be sandwiched between upper and lower layers 66 and 68, respectively, of a suitable vinyl plastic material having edge portions 70, a front end portion 72 and a rear end portion 74 heat-fused together.

Each block 54 also includes suitable linking or connecting means in the form of a male connector element 76, which is formed integrally with the front edge 72, and a female connector element 78, which is provided in the rear edge 74. Thus, as shown in FIGURE 1, the male connector element 76 of a following block may be engaged in the female connector element 78 provided in a leading block. This permits linking a number of blocks 54 together for enhancing the play value of the device 10 by permitting a child user to link a number of different startling combinations together. For example, a plurality of blocks 54 may be sorted on the top wall 18 and connected together as shown in FIGURE 1 whereupon the assembled blocks may be slid into the channel 20. Thus, a child may form a complete sentence by starting with a noun and linking a verb thereto. An adjective may then be linked to the verb and another noun to the adjective. Since suitable pictures and words identify the particular nouns, verbs and adjectives used, and since a child may be taught that a particular picture and word combination represents a noun, verb or adjective by having an applicable indicia displayed on the associated card 56, the child soon learns proper sentence structure. Additionally, the blocks 54 containing rhyming words may all be identified by a particular color (not shown) for facilitating the construction of poems.

The visual presentation of the material on the blocks 54 is reinforced by an audible presentation thereof. This is accomplished by providing each block 54 with a first sound track means 80 on the upper surface 82 of the upper plastic layer 66 and a second sound track means 84 on the lower surface 86 of the lower plastic layer 68. These sound tracks means 80, 84 each includes a plurality of sound tracks 88 (FIGURE 4) each recording the information visually presented on the reverse side of a particular card 56 in a different language. For example, the word "frog" may be recorded in English, French, Italian and Spanish by using the four sound tracks shown in FIGURE 4. Manufacturing tolerances may be minimized by including a plurality of individual grooves 90 in each sound track 88 and by recording the same message in each groove 90 so that a phonograph needle, to be hereinafter described, will engage a groove 90 even though slight lateral shifting may occur between the needle and the blocks 54.

Referring now more in particular to FIGURES 1, and 6–9, the blocks 54 may be moved through channel 20 by a pair of rollers 92, 94 which are affixed to a shaft 96 for rotation thereby. The shaft 96 has a first end 98 journalled in a bearing block 100 provided on the top wall 22, a mid-portion 102 journalled in a bearing block 104 affixed to the inner surface 106 of wall 36 and a second end 108 journalled in a bracket 110 depending from the top wall 16. The shaft 96 is rotated by a gear 112 affixed to the end 108 thereof for driving engagement with a worm gear 114 which is driven by an electric motor 116. The worm gear 114 includes a first end 118 which is journalled in an upstanding bearing block 120 and a second end 122 which is journalled in an upstanding bearing block 124. The bearing blocks 120 and 124 may be affixed to the bottom wall 32, as shown for the bearing block 124 in FIGURE 6. A flexible connector 126 connects the end 122 of worm gear 114 to an output shaft 128 on the electric motor 116.

Figure 7:
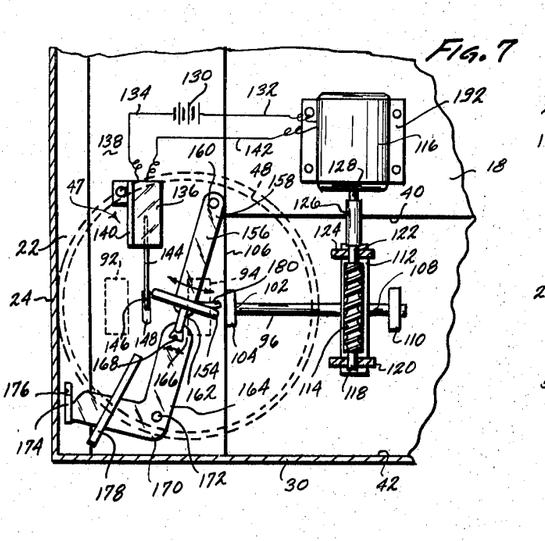
FIGURE 7 is an enlarged, partial cross-sectional view taken along line 7—7 of FIGURE 6.
Figure 8:
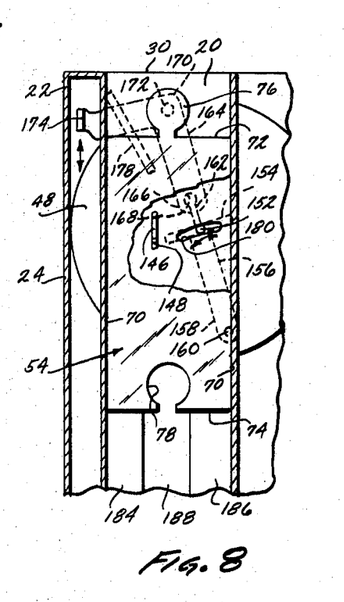
FIGURE 8 is an enlarged, partial cross-sectional view taken along line 8—8 of FIGURE 6.
Figure 9:
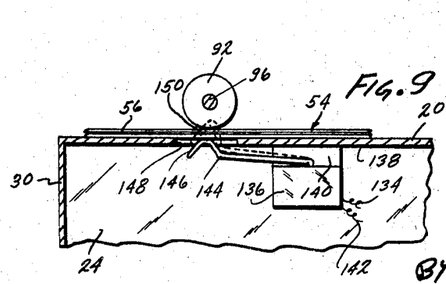
FIGURE 9 is an enlarged, partial cross-sectional view taken along line 9—9 of FIGURE 6.
Figure 11:
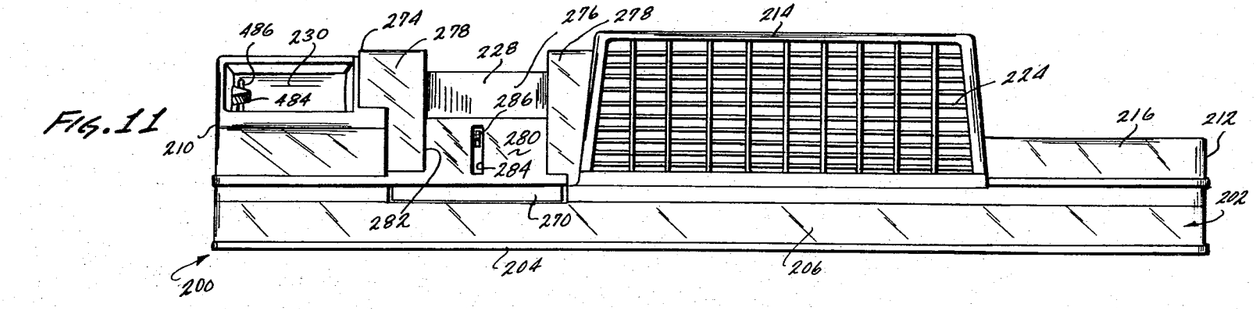
FIGURE 11 is a front elevational view of a toy device constituting a second embodiment of the present invention.

Power for operating the motor 116 is supplied by a suitable dry cell means, as indicated schematically at 130 in FIGURE 7, which is connected by a first lead 132 to the motor 116 and by a second lead 134 to a switch means 136 affixed to the underside 138 of channel 20 by a bracket means 140. The switch means 136 is connected to the motor 116 by a lead 142 and includes an actuating lever 144 having an arcuate portion 146 extending upwardly through a slot 148 provided in the channel 20 subjacent the shaft 96. The actuating lever 144 may be depressed to energize the motor 116 by pushing blocks 54 along channel 20 until the connector means 76 on a leading block 54 engages the arcuate portion 146. This moves lever 144 to the position shown in FIGURE 9 in solid lines energizing motor 116 for imparting rotation to the rollers 92 and 94. Slight additional manual movement of the leading block 54 will then engage its edge 72 in the nip 150 of the rollers 92 and 94 permitting the rollers to automatically draw the blocks 54 through channel 20 at a uniform rate while a phonograph needle 152 engages a groove 90.

The needle 152 is carried by a connector means 154 operatively associating the needle 152 with the apex portion 50 of the speaker cone 48. A spring 155 has one end 155a bearing against bottom wall 32 and another end 155b bearing against the apex portion 50 to maintain proper engagement of the apex portion 50 with the connector means 154 and of the needle 152 with the grooves 90. The connector means 154 is carried by a tone arm assembly 156 having one end 158 connected to the underside 138 of channel 20 by a pin 160. The tone-arm assembly 156 also includes an end 162 operatively connected to an L-shaped lever 164. The lever 164 has an end 166 provided with a notch 168 in which the end 162 is seated, a mid-portion 170 pivotally connected to the underside 138 of channel 20 by a pin 172 and a second end 174 extending upwardly through a slot 176 provided adjacent the channel 20. The end 174 is supported by a bracket 178 affixed to the underside 138 of channel 20 and may be swung to move the tone-arm assembly 156 for positioning the needle 152 within an arcuate slot 180 provided in the channel 20 subjacent the roller 94. The needle 152 may be positioned within slot 180 for selecting a particular sound track 88. The roller 94 constitutes compressing means for minimizing sound-disturbing vibrations in block 54 and for assuring that block 54 will be maintained in proper engagement with the needle 152 as the rollers 92 and 94 move the blocks 54 through channel 20 and out the discharge end 182 thereof. During this movement, frictional drag on the blocks 54 is minimized by a pair of spaced-apart parallel rails 184, 186 which are preferably made from one of the well known low-coefficient-of-friction type plastic materials and which extend along the channel 20 from its entrance end 188 to its discharge end 182.

If the blocks 54 are not driven through the channel 20 at a uniform rate, a change in pitch from the true recorded material will result. Rate of change of pitch is called "flutter" and "wow." "Wow" is a rather slow, wavering pitch and "flutter" is heard as a faster rate of change. "Flutter" and "wow" are minimized in the device 10 by using the rails 184, 186 and by making the rollers 92, 94 compliant in a radial direction.

The motor 116 is affixed to a partition 190 in housing 12 by a bracket 192 and is ventilated by air entering through suitable rectangular openings 193 provided in the housing portion 16. The openings 193 also serve as sound outlets for the speaker cone 48.

Operation of the device 10 will be readily understood. A plurality of blocks 54 may be placed on the table top 18 where a child user may see the pictures provided thereon. The child may learn to identify a particular printed word associated with a particular picture by moving an assoicated block 54 along channel 20 until the associated connecting means 76 depresses the switch arm 144 energizing motor 116 for rotating the rollers 92, 94 which then draw the block 54 through channel 20 in operative association with the needle 152 at a proper speed to audibly reproduce the recorded message 90 which pronounces the word printed on the block 54.

The lever 174 may be actuated to position the needle 152 within arcuate slot 180 so that the needle 152 will be aligned with different sound tracks 88 for different desired audible reproductions of the word printed on block 54 in different languages, as heretofore mentioned.

The child user may also take a plurality of blocks 54 from the table top 18 and connect them together in any desired manner in an effort to form complete sentences which may be reproduced by placing the linked blocks 54 into channel 20 and engaging the leading block in the nip 150 of rollers 92, 94 so that all of the blocks 54 will be drawn sequentially over the needle 152.

Referring now more in particular to FIGURE 10, a modified block 54a is shown wherein the linking means 76a and 78a are shaped to resemble arrow heads for indicating the direction of travel of the blocks 54a within channel 20 to minimize the likelihood that the child will place the blocks 54 in the channel 20 backwards. The blocks 54a are provided with musical notes 60a which are recorded in sound track means 80a on the blocks 54a by suitable instruments. The sound track means 80a includes a plurality of sound tracks 88a each of which includes at least four grooves 90a compensating for slight misalignment of the needle 152. Each sound track 88a may be recorded by a different instrument so that a child may select different types of sounds by actuating the lever 174 to position needle 152.

In use, the blocks 54a provide a means whereby a child may compose music. Even a very young child may connect a plurality of blocks 54a together and get surprising results which greatly enhance the play value of the toy device 10. The manner in which the blocks 54a are linked together must be obvious and simple when the toy device 10 is used by pre-school children. Although such children can pick up and hold a block 54a fairly easily, it becomes a much more difficult problem when they need to insert the linking means 76a on one block 54a into the linking means 78a on another block. The smaller that the target becomes, the more difficult the problem becomes for these children. This problem is minimized by confronting these children with a cut-out area in the shape of an arrow and a corresponding protruding arrow shape. Interlocking the blocks 54a together creates a potential for learning phrase building and sentence building on the part of the child user because he has locked the words together forming a unit or phrase. The arrow-shaped linking means 76a, 78a also make the direction of play of the blocks 54a obvious to a child.

Referring now to FIGURES 11–21, a toy device constituting a second embodiment of the present invention, generally designated 200 includes a housing means 202 having a bottom wall 204, a front wall 206, a rear wall 208, a pair of end walls 210, 212 and a top wall 214. The top wall may be molded from a suitable, fairly rigid plastic material and may be shaped during the molding operation to provide a pocket 216 for storing a plurality of carrier means, such as the one shown at 54b in FIGURE 20, which may be stood on its end 74b with its female connector means 78b engaging one of the ribs 218, 220 provided on the bottom wall 222 of pocket 216. The top wall 214 is also shaped during the molding operation to form an upstanding housing 224 for a horn 226 (FIGURE 13) forming part of a player means to be hereinafter described. Additionally, the top wall 214 is shaped during the molding operation to provide a hopper means 228 for storing a stack of carrier means 54b and a cover means 230 for covering a carrier-means feeding and playing mechanism, indicated generally at 232. A trough 234 is provided having a sloping bottom wall 236 and associated side walls 238, 240. The trough 234 has a first open end 242 adjacent the end wall 212 and a second open end 244 adjacent the end wall 210.

Figure 12:
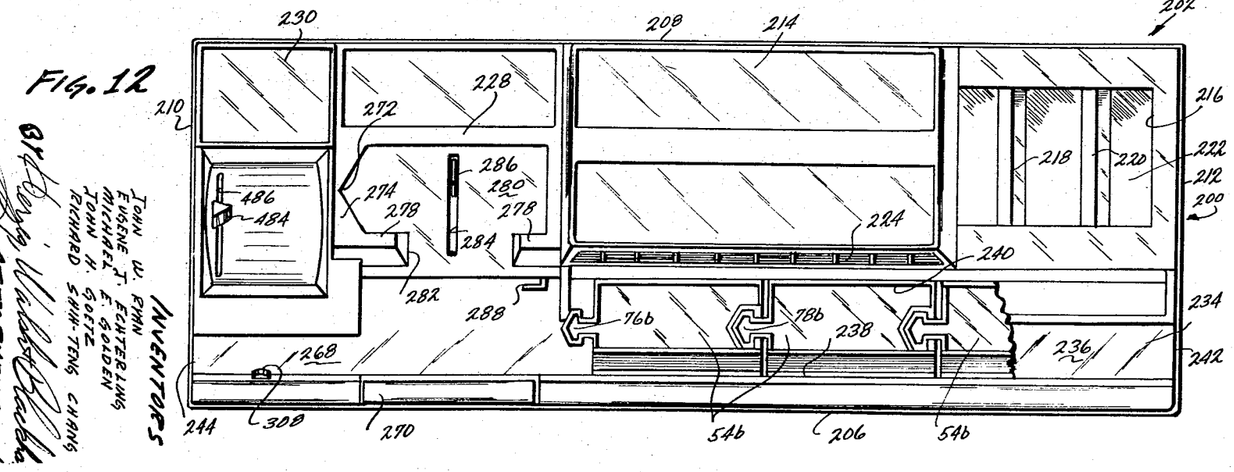
FIGURE 12 is a top, plan view of the device shown in FIGURE 11.
Figure 17:
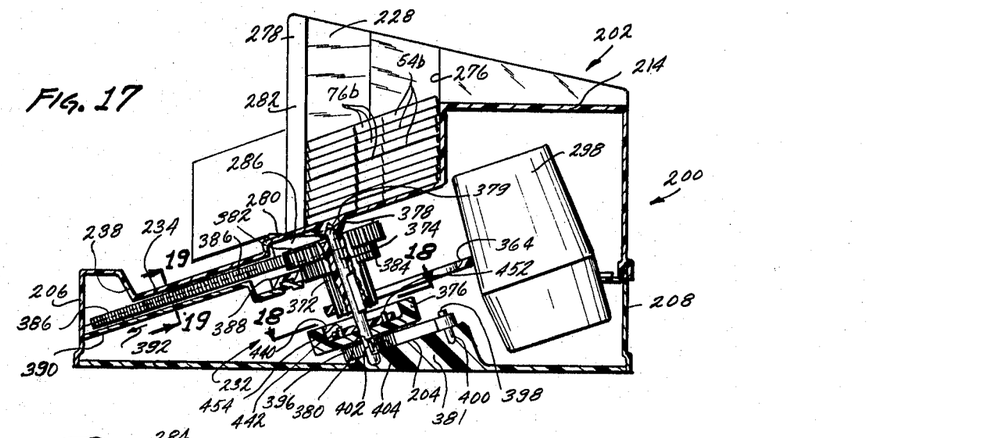
FIGURE 17 is a cross-sectional view taken along line 17—17 of FIGURE 13.
Figure 20:
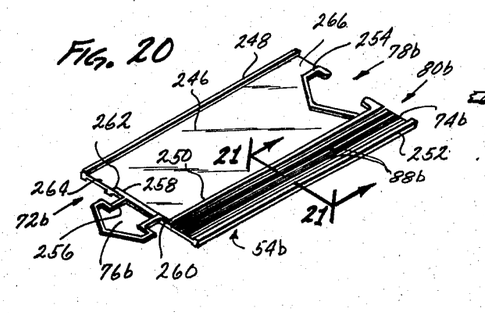
FIGURE 20 is a perspective view of a further modified carrier means which may be used with the device shown in FIGURE 1 or, alternatively, with the device shown in FIGURE 11.
Figure 21:
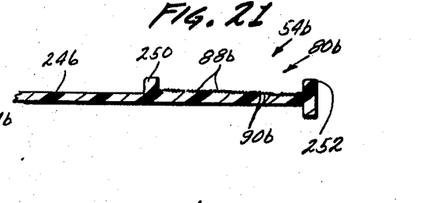
FIGURE 21 is an enlarged, partial cross-sectional view taken along line 21—21 of FIGURE 20.

Referring now more in particular to FIGURES 20 and 21, each carrier means 54b may be molded from a suitable plastic material of the low-coefficient-of-friction type and includes an elongated body portion 246 having a front edge 72b, the rear edge 74b, and a plurality of parallel, spaced-apart reinforcing ribs 248, 250 and 252. The body portion 246 is of a fairly thin construction to conserve material and is given a certain amount of rigidity by the ribs 248, 250 and 252. The female linking means 78b forms an arrow-shaped opening in the body portion 246 and is surrounded by a raised lip 254 which facilitates engaging a male linking means 76b from another carrier means 54b therewith. The male linking means 76b is also arrow-shaped, is formed integrally with body portion 246 during the molding operation and is surrounded by a raised lip 256. A transverse lip 258 is formed along edge 72b during the molding operation and includes a first end 260 which abuts the rib 250 and a second end 262 which is spaced from the rib 248 leaving an opening 264 at edge 72b corresponding in size to a similar opening 266 provided along rear edge 74b between rib 248 and lip 254. Each carrier means 54b may be provided with any of the indicia means shown in connection with carrier means 54 and 54a and with sound track means 80b including a plurality of sound tracks 88b each having a plurality of record grooves 90b. A plurality of carrier means 54b may be linked together as shown in FIGURE 12 and slid along trough 234 from open end 242 to a playing station 268 where each block 54b is automatically operated upon by the feeding and playing mechanism 232. The carrier means 54b are then discharged from trough 234 through an opening 244. Alternatively, a plurality of carrier means 54b may be stacked in the hopper means 228, as shown in FIGURE 17, and fed into playing position one at a time by depressing an actuating bar 270 mounted in housing means 202 adjacent trough 234. Stacking the carrier means 54b in the hopper means 228 in a properly oriented position is facilitated by shaping the hopper means 228 in such a manner that the blocks 54b may only be placed therein with the male linking means 76b facing toward end wall 210 with the linking means 76b disposed in a V-shaped recess 272 provided in an end wall 274 forming a part of hopper means 228. Also forming a part of hopper means 228 are a rear wall 276, a front wall 278 and a sloping bottom wall 280. The front wall 278 has a large opening 282 provided therein through which a child's hand may be admitted during the stacking of carrier means 54b in hopper means 228. The bottom wall 280 is provided with an elongated opening 284 within which a reciprocating finger 286 is mounted for ejecting carrier means 54b from hopper means 228 to trough 234 where carrier means 54b is engaged by a reciprocating finger 288 which moves carrier means 54b into the playing station 268.

Referring now more in particular to FIGURES 13–19, the feeding and playing mechanism 232 includes an electric motor 290 receiving power from four dry cell means 292, 294, 296 and 298 through a first lead 300 connected from the battery means to the motor 290, a second lead 302 connected from the battery means to a first switch 304 and a third lead 306 connected from switch 304 to the motor 290. The switch 304 is actuated by a roller 308 rotatably mounted in wall 238 in the path of travel of carrier means 54b so that motor 290 will be energized each time a carrier means 54b engages the roller 308. The motor 290 is also energized each time the bar 270 is depressed. This is accomplished through a first electrical contact 310, which is carried by the bar 270, and a second electrical contact 312, which is carried by the front wall 206. The contacts 310, 312 are connected to leads 306 and 302 by leads 314 and 316, respectively.

The motor 290 is connected to a governor 317 by an output shaft 318 (FIGURES 13 and 15) to which a combined governor rotor and pulley 320 is affixed for rotation thereby for, in turn, maintaining proper motor speed and for imparting rotation to a flywheel 322 through a belt 324 which is trained about pulley 320 and flywheel 322. The governor 317 includes a bearing plate 317a, formed integrally with cover means 230 and an encompassing sidewall 317b. The rotor portion 317c of the combined rotor and pulley 320 carries governor weights 317d which are biased toward portion 317c by associated springs 317e.

The flywheel 322 is rotatably mounted in housing means 202 by a first spindle 326, which is journalled in a bushing 328 affixed to a bearing plate 329, and a second spindle 330, which is journalled in a bushing 332 affixed to a support plate 333. The flywheel 322 includes a hub 334 which carries a compliant band 336 and which is provided with an annular groove 338. The band 336 is engageable with the rib 248 on carrier means 54b for moving it through the playing station 268 and out the open end 244 of trough 234 when flywheel 322 is rotated by motor 290. A belt 340 is trained about hub 334 in groove 338 and about a pulley 342 (FIGURES 13 and 16) for imparting rotation thereto. The pulley 342 is carried by a shaft 344 having an upper end 346 journalled in a bearing plate 348 and a lower end 350 journalled in a support plate 351. A disc 352 and a cam 354 are affixed to the lower end 350 of shaft 344 for rotation thereby. The cam 354 includes a high spot 356 and a low spot 358 (FIGURES 13 and 14) engageable by a finger 360 provided on a first end 362 of a lever 364 having a second end 366 which carries a gear sector 368. The lever 364 is swingably mounted in housing means 202 by a pivot pin 370 affixed to lever 364 intermediate the ends 362 and 366.

As may be best seen in FIGURES 13–14 and 17–18, the gear sector 368 drivingly engages a spur gear 372 affixed to a spindle 374 formed integrally with a flywheel 376 and having a first end 378 journalled in a bearing plate 379 and a second end 380 journalled in the support plate 381. A large-diameter rack gear 382 and a small-diameter rack gear 384 may be formed integrally with the spur gear 372 by molding them from a suitable plastic material and are mounted on the spindle 374 in operative association with a first rack 386 and a second rack 388, respectively. The first rack 386 is reciprocally mounted in the housing means 202 on a plate 390 and carries the finger 286 which ejects a carrier means 54b from hopper means 228 onto trough 243 each time rack 386 moves in the direction of arrow 392. The rack 388 is reciprocally mounted on the plate 390 normal to the rack 386 and carries the finger 288 for moving a carrier means 54b along trough 234 into playing station 268 each time rack 388 is moved in the direction of arrow 394. The racks 386, and 388, are reciprocated by oscillating their associated gears 382 and 384, respectively. The gears 382 and 384 are oscillated by spur gear 372 which, in turn, is rotated in a clockwise direction, as viewed in FIGURES 13 and 14, by a clock-type spring 396 having a first end 398 affixed to housing means 202 by a pin 400 and a second end 402 affixed to the spindle 374 by a rivet 404. The spur gear 372 is rotated in a counterclockwise direction, as viewed in FIGURES 13 and 14, by the sector gear 368 is swung from the position shown in FIGURE 14 to the position shown in FIGURE 13 by the coaction of lever arm 364 and cam 354. Rotation of the gear 372 in a counterclockwise direction by spring 396 swings lever arm 364 to its FIGURE 14 position where finger 360 engages the low spot 358 on cam 354. Rotation of cam 354 by motor 290 through belts 324 and 340 exerts a force on finger 360 which swings gear sector 368 from its FIGURE 14 position to its FIGURE 13 position rotating gear 372 in a counterclockwise direction sufficiently to load spring 398 and rotate rack gears 382 and 384 a predetermined amount in a counterclockwise direction. The amount of rotation imparted to the gear 382 is sufficient to move rack 386 from its FIGURE 14 position to its FIGURE 13 position where it will be noted that finger 286 has moved a carrier means 54b from hopper means 228 to a position on trough 234 where edge 74b of carrier means 54b is engageable by finger 288 on rack 388. The amount of counterclockwise rotation imparted to rack gear 384 is sufficient to move rack 388 from its FIGURE 14 position to its FIGURE 13 position where the finger 288 is ready to engage edge 74b and push carrier means 54b to its FIGURE 14 position when finger 360 on lever arm 364 leaves high spot 356 on cam 354 and drops into low spot 358 so that spring 398 can rotate gear 372 in a clockwise direction moving finger 288 from its FIGURE 13 position to its FIGURE 14 position while simultaneously moving rack 386 from its FIGURE 13 position to its FIGURE 14 position where finger 286 is ready to engage another carrier means 54b in hopper means 228.

Figure 13:
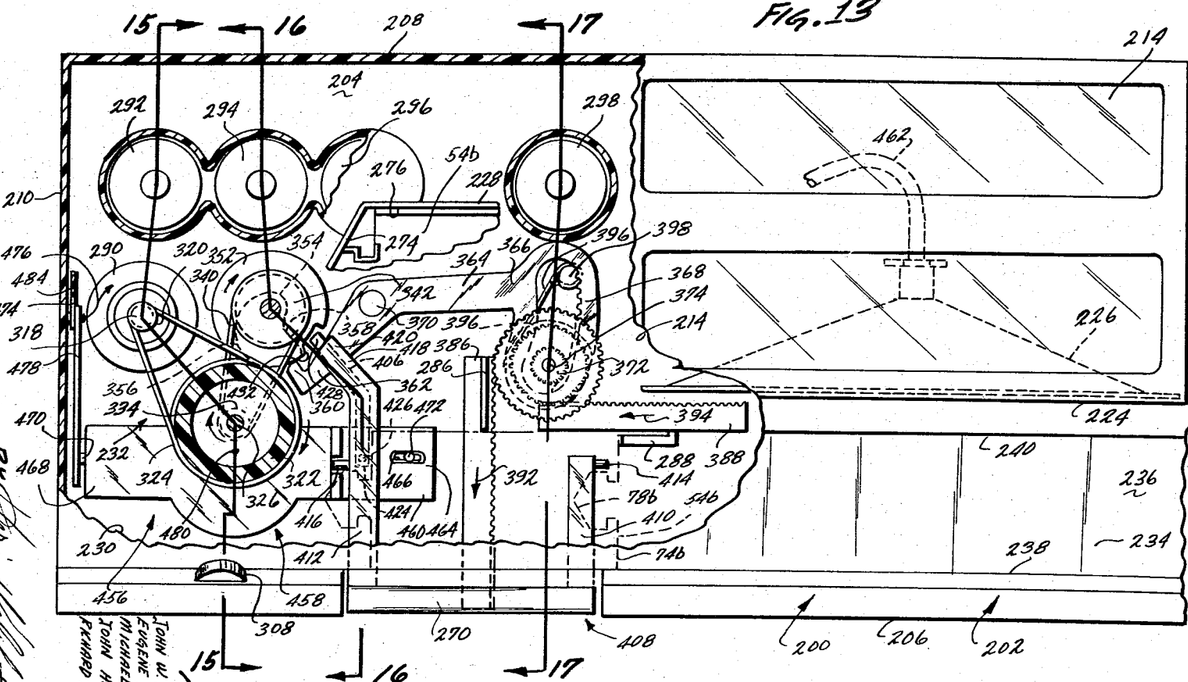
FIGURE 13 is an enlarged, partial plan view, with parts broken away to show internal construction, of the device shown in FIGURE 11.

Operation of racks 386 and 388 is controlled by the operative association of finger 360 on lever arm 364 with cam 354. This operative association is, in turn, controlled by bar 270 through electrical contacts 310 and 312, which complete a circuit to motor 290 for rotating cam 354, and through a leaf spring means 406, which holds lever arm 364 at rest until bar 270 is depressed for energizing cam 354. The bar 270 forms the bight portion of a U-shaped member 408 having parallel arms 410, 412 pivotally mounted in housing means 202 by associated pivot pins 414, 416, respectively (FIGURE 13). The arm 412 is provided with an angular extension 418 having a free end 420 extending over lever arm 364 to a position adjacent disc 352. The spring means 406 is affixed to the underside 422 of extension 418 (FIGURE 16) and includes a fixed end 424 secured to bottom wall 204 by rivet means 426. The spring means 406 also includes a free end 428 extending to a position beneath disc 352 and carrying a depending pin 430 engageable with lever arm 364 for maintaining it at rest until free end 428 is relieved upwardly through a notch 432 provided in disc 352 adjacent high spot 356 on cam 354. Thus, when bar 270 is depressed, free end 420 of extension 418 moves upwardly pressing the free end 428 of leaf spring means 406 against the underside 434 until notch 432 permits free end 428 to be relieved upwardly freeing pin 430 from engagement with lever arm 364.

Figure 14:
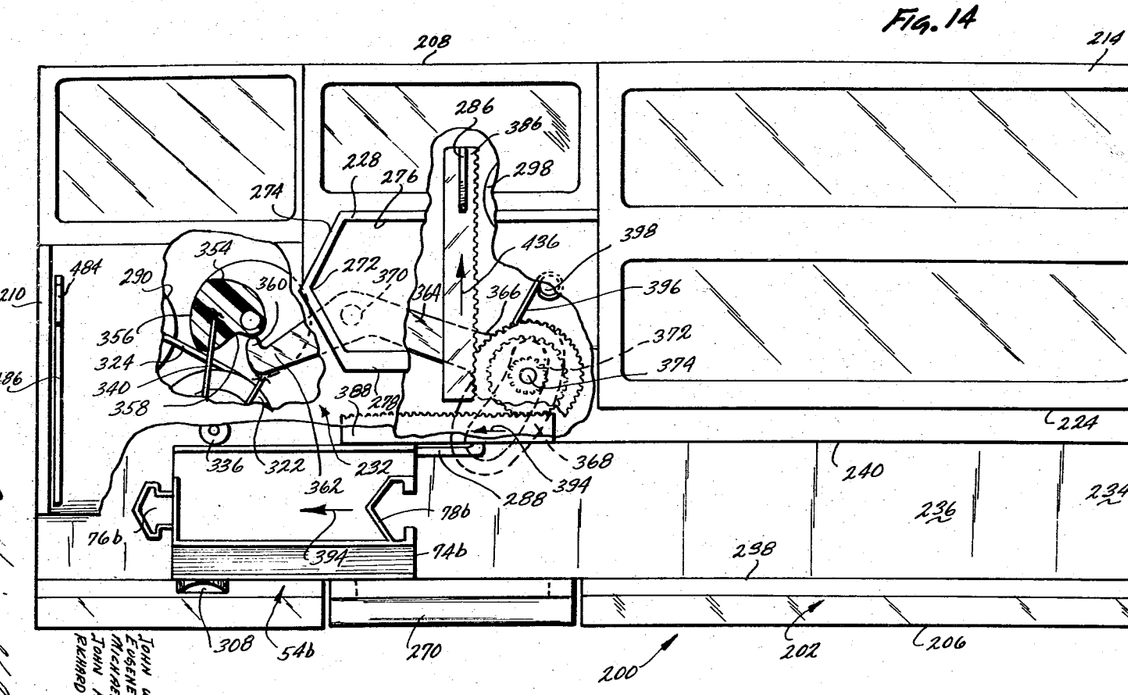
FIGURE 14 is a plan view similar to FIGURE 13 showing certain portions thereof in a different operative position than that shown in FIGURE 13.
Figure 15:
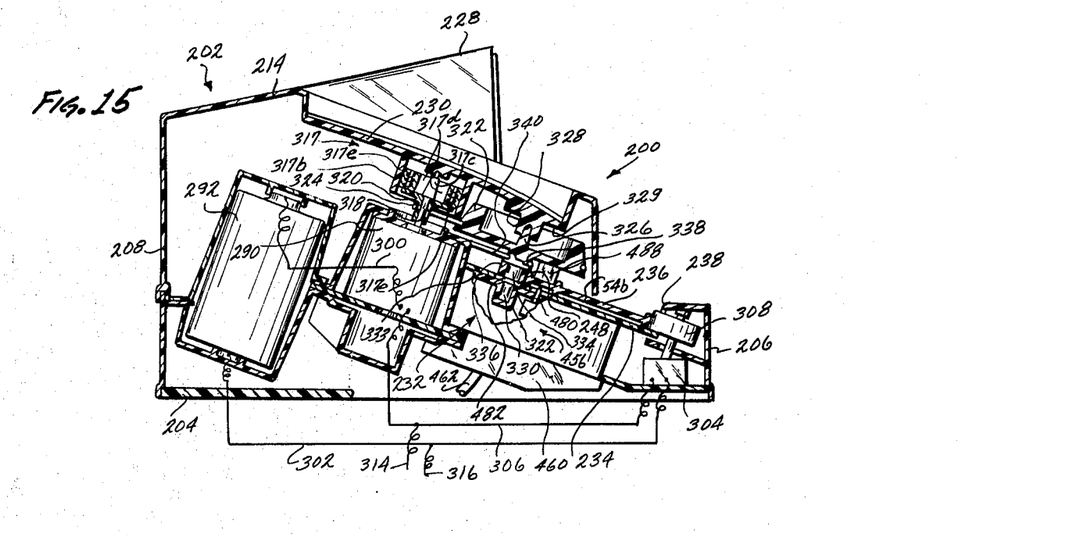
FIGURE 15 is a cross-sectional view taken along line 15—15 of FIGURE 13.
Figure 16:
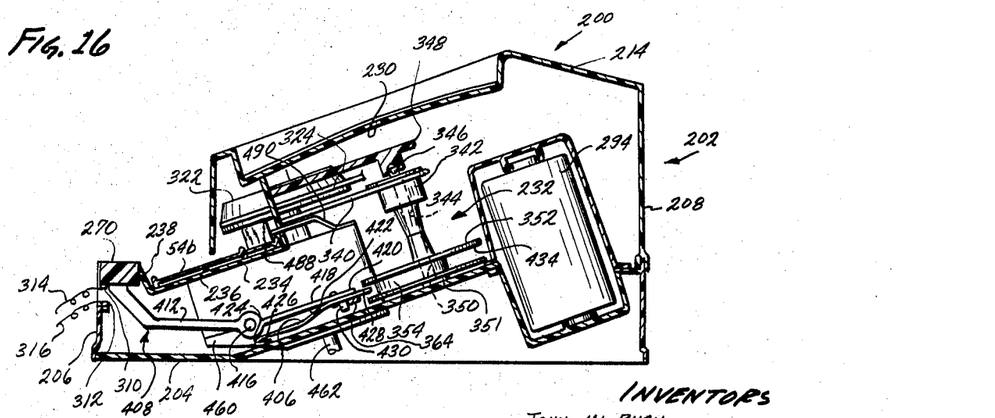
FIGURE 16 is a cross-sectional view taken along line 16—16 of FIGURE 13.
Figure 18:
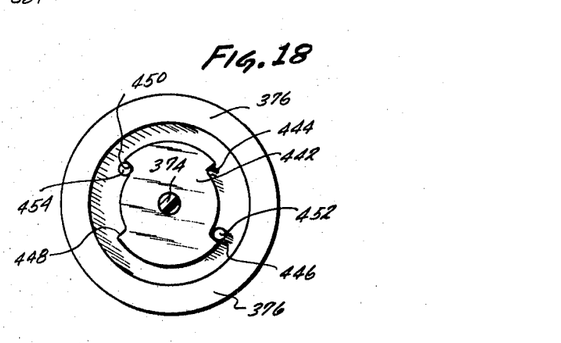
FIGURE 18 is an enlarged cross-sectional view taken along line 18—18 of FIGURE 17.
Figure 19:
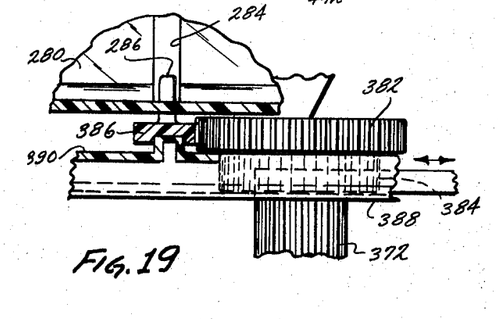
FIGURE 19 is an enlarged, partial cross-sectional view taken along line 19—19 of FIGURE 17.

Referring now more in particular to FIGURES 17 and 18, the flywheel 376 stores energy from clock spring 396 during the unwinding thereof to move rack 386 in the direction of arrow 436 and of rack 388 in the direction of arrow 394 (FIGURE 14). This energy assures that rack 388 will reach the end of its stroke even though the energy stored in clock spring 396 may become completely dissipated. The flywheel 376 includes a base plate 438 and an upstanding, annular flange 440 and is damped during oscillation thereof by a disc 442 which lies loosely on plate 438. The disc 442 includes a first set of shoulders 444, 446 and a second set of shoulders 448, 450 engageable with fixed pins 452, 454, respectively, affixed to plate 438.

Referring now to FIGURES 13, 15, 20 and 21, the device 200 includes a player means, generally designated 456, for reproducing recorded sounds provided on carrier means 54b. The player means 456 includes a sound pickup means 458 having a casing 460 acoustically connected to the horn 226 by a hollow, flexible tube 462 for conveying sounds thereto. The casing 460 includes a first end 464 which is provided with a slot 466 and a second end 468 which carries a pin 470. The casing 460 is swingably mounted in housing means 202 on a fixed pin 472 which is engaged in slot 466 and may be swung by an actuating lever 474 which is pivotally connected to end wall 210 by a pin 476 and which is connected to pin 470 on casing 460 by a link 478. The casing 460 carries a phonograph needle 480 which may be positioned within a slot 482, provided in trough 234 in the path of travel of grooves 90b on carrier means 54b, by swinging lever 474. The lever 474 may be swung by grasping a button 484 positioned above a slot 486 (FIGURES 11 and 12) provided in cover 230. The needle 480 may be positioned to selectively reproduce the sounds provided on any of the sound tracks 88b. Proper engagement of grooves 90b with needle 480 is assured by a pressure pad 488 which may be made of a suitable low-coefficient-of-friction material and which is of sufficient thickness to uniformly bear against the underside 490 of flywheel 322 and the body portion 246 of carrier means 54b along a path defined by open ends 264 and 266. The pad 488 may be supported within housing means 202 by a suitable bracket means 490.

Operation of the device constituting the second embodiment of the present invention will be readily understood.

A child-user may, if desired, select a single carrier means 54b having indicia means of the type carried by carrier means 54 or carrier means 54a and audibly reproduce the recorded material provided thereon by sliding carrier means 54b along trough 234 in the direction of arrow 394 until carrier means 54b engages switch 308 energizing motor 290 to rotate roller 336 through belt 324. Roller 336 then moves carrier means 54b across needle 480 causing player means 456 to audibly reproduce the material recorded on the sound track 88b which is engaged by needle 480, depending upon the position of button 484.

If desired, the child-user may link a plurality of carrier means 54b together, as shown in FIGURE 12, and slide them into playing position in playing area 268. The roller 336 will then automatically drive all of the carrier means 54b across the photograph needle 480.

Alternatively, the child-user may place a stack of carrier means 54b in hopper means 228 and run each of the carrier means 54b over needle 480 by depressing bar 270 to energize motor 290 and release lever arm 364 so that spur gear 372 will be rotated in a clockwise direction, as viewed in FIGURE 13, by the energy stored in spring 396 moving rack 386 in the direction of arrow 436 and rack 388 in the direction of arrow 394 to return rack 386 to its FIGURE 14 position and to move a first carrier means 54b along trough 234 into playing position where roller 336 moves it across needle 480. The cam 354 will then swing lever 364 in a counterclockwise direction, as viewed in FIGURE 13, moving racks 386 and 388 from their FIGURE 13 positions to their FIGURE 14 positions so that the rack 386 may eject another carrier means 54b from hopper means 228 while rack 388 is being retracted to its starting position where it is ready to push the second carrier means 54b into playing position.

Carrier means 54b will continue to be fed from hopper means 228 onto trough 234 and pushed into playing position as long as bar 270 remains depressed. When the bar 270 is released, the free end 428 of spring means 406 will ride on top of disc 352 until notch 432 permits free end 428 to drop down under disc 352. At this time, bar 270 will be permitted to return to its up position opening contacts 310, 312 for deenergizing motor 290. This assures that the device 200 will always be deenergized with the spring 396 in a fully wound condition.

The pad 488 forms a part of the feeding and playing mechanism 232 and constitutes compressing means engageable with the carrier means 54b for maintaining it in operative association with the player means and for minimizing sound-disturbing vibrations in the carrier means 54b.

While the particular toy devices herein shown and described in detail are fully capable of attaining the objects and providing the advantages hereinbefore stated, it is to be understood that they are merely illustrative of the presently preferred embodiments of the invention.

What is claimed is:

1. In a toy device for audibly reproducing recorded material, the combination comprising:

player means for reproducing recorded sounds;

carrier means having said recorded sounds provided thereon;

linking means on said carrier means for linking a plurality of said carrier means together;

indicia means on said carrier means for conveying a visual image of said recorded sounds; and feed means for moving said carrier means through said player means, said feed means including compressing means engageable with said carrier means for maintaining it in operative association with said player means and for minimizing sound-disturbing vibrations in said carrier means;

said player means including a phonograph needle and said carrier means including a plurality of adjacent parallel sound grooves each provided with said recorded sound whereby slight misalignment of said carrier means with said needle will always permit said needle to enter one of said grooves.

2. A combination as stated in claim 1 wherein said linking means comprise complementary arrow shaped projections and openings defining direction-of-travel indicating means.

3. A combination as stated in claim 1 wherein said carrier means includes a plurality of parallel sound tracks, each of said sound tracks having the same material recorded thereon in a different language and wherein said player means includes lever means connected to said phonograph needle for selectively positioning said phonograph needle with respect to said sound tracks.

4. A combination as stated in claim 3 wherein said player means includes casing means carrying said phonograph needle, horn means and tubing means connecting said casing means to said horn means.

5. A combination as stated in claim 4 wherein said carrier means includes a leading edge and a trailing edge and wherein said linking means comprises a male connector extending from said leading edge and a female connector provided in said carrier means adjacent said trailing edge.

6. A combination as stated in claim 5 wherein said indicia means includes printed words and indicia grammatically identifying said printed words.

7. A combination as stated in claim 6 wherein said toy device includes hopper means adjacent said player means for storing a plurality of said carrier means and wherein said feed means comprises:

an electric motor having an output shaft;

a first flywheel rotatably mounted adjacent said output shaft;

a first belt connecting said output shaft to said first flywheel;

a roller driven by said first flywheel adjacent said player means in the path of travel of said carrier means for moving said carrier means into operative association with said player means;

a cam means rotatably mounted adjacent said first flywheel means, said cam means including a high spot and a low spot;

a second belt connecting said first flywheel to said cam means for imparting rotation thereto;

a lever arm swingably mounted adjacent said cam means, said lever arm having a finger extending into operative association with said cam means and a gear sector;

a spur gear operatively associated with said sector gear for rotation thereby when said lever arm is swung in one direction;

a depressible bar connected to said lever arm for maintaining said finger out of engagement with said cam means until said bar is depressed;

a clock spring connected to said spur gear for rotating said spur gear in another direction when said finger leaves said high spot on said cam and moves towards said low spot thereon;

first and second rack gears connected to said spur gear for rotation thereby;

first and second racks reciprocably mounted in operative association with said first and second rack gears, respectively, one of said racks being mounted in operative association with said hopper means for ejecting said carrier means therefrom and the other of said racks being mounted in operative association with said player means for pushing said carrier means into playing position;

electrical switch means connecting said bar to said motor means for energizing said motor means when said bar is depressed; and a second flywheel operatively associated with said clock spring for storing energy from said clock spring during the unloading thereof.

8. In a toy device for audibly reproducing recoded material, the combination comprising:

player means for reproducing recorded sounds;

carrier means having said recorded sounds provided thereon;

indicia means on said carrier means for conveying a visual image of said recorded sounds;

feed means for moving said carrier means through said player means, said feed means including compressing means engageable with said carrier means for maintaining it in operative association with said player means and for minimizing sound-disturbing vibrations in said carrier means; and hopper means for storing a plurality of said carrier means adjacent said player means, said feed means including first rack means for ejecting said carrier means from said hopper means and second rack means for pushing said carrier means into operative association with said player means.

References Cited

UNITED STATES PATENTS

| | | | |
|---|---|---|---|
| 2,548,011 | 4/1951 | Frost | 35—8.1 |
| 2,822,425 | 2/1958 | Hicks | 35—8.1 |
| 3,087,259 | 4/1963 | Orlick et al. | 35—35.3 |
| 3,325,916 | 6/1967 | Greenlee | 35—35.3 |
| 3,383,114 | 5/1968 | Ryan | 35—8.1 |
| 3,391,476 | 7/1968 | Sher | 35—35.3 |
| 3,397,467 | 8/1968 | Genin et al. | 35—35.3 |

OTHER REFERENCES

IBM Technical Disclosures in vol. 7, No. 1, June 1964, pp. 25 and 26, and in vol. 7, No. 6, November 1964, p. 482.

EUGENE R. CAPOZIO, Primary Examiner

W. W. NIELSEN, Assistant Examiner

U.S. Cl. X.R.

35—35; 274—42